United States Patent
Chen et al.

(10) Patent No.: US 10,298,446 B2
(45) Date of Patent: May 21, 2019

(54) METHODS, APPARATUSES, AND SYSTEM FOR DEVICE MANAGEMENT

(71) Applicant: Xiaomi Inc., Beijing (CN)

(72) Inventors: Yong Chen, Beijing (CN); Weiyang Chen, Beijing (CN); Bo Yu, Beijing (CN); Yidong Wang, Beijing (CN); Pengfei Zhang, Beijing (CN); Yu Guo, Beijing (CN)

(73) Assignee: Xiaomi Inc., Beijing (CN)

( * ) Notice: Subject to any disclaimer, the term of this patent is extended or adjusted under 35 U.S.C. 154(b) by 247 days.

(21) Appl. No.: 15/137,117

(22) Filed: Apr. 25, 2016

(65) Prior Publication Data

US 2016/0241431 A1    Aug. 18, 2016

Related U.S. Application Data

(63) Continuation of application No. PCT/CN2015/080681, filed on Jun. 3, 2015.

(30) Foreign Application Priority Data

Dec. 24, 2014    (CN) .......................... 2014 1 0815619

(51) Int. Cl.
*G06F 15/173* (2006.01)
*H04L 12/24* (2006.01)
(Continued)

(52) U.S. Cl.
CPC .......... *H04L 41/08* (2013.01); *H04L 12/2814* (2013.01); *H04L 25/20* (2013.01); *H04L 65/1069* (2013.01); *H04W 8/22* (2013.01)

(58) Field of Classification Search
CPC ..... H04L 41/08; H04L 12/2814; H04L 25/20; H04L 65/1069; H04W 8/22
(Continued)

(56) References Cited

U.S. PATENT DOCUMENTS 7,068,624 B1 *   6/2006  Dantu ..................... H04L 45/50
                                                    370/331
8,200,527 B1 *   6/2012  Thompson ......... G06Q 10/0639
                                                    705/7.39
(Continued)

FOREIGN PATENT DOCUMENTS

CN          1387345 A       12/2002
CN          1599344 A        3/2005
(Continued)

OTHER PUBLICATIONS

English version of International Search Report issued in PCT/CN2015/080681, mailed from the State Intellectual Property Office of China dated Sep. 29, 2015.
(Continued)

*Primary Examiner* — Sm A Rahman
(74) *Attorney, Agent, or Firm* — Finnegan, Henderson, Farabow, Garrett & Dunner LLP

(57) ABSTRACT

A device management method for use in a primary router, includes: establishing a management connection with a relay router; acquiring a management interface identifier from the relay router via the management connection, the management interface identifier being an identifier of an Application Programming Interface (API) in the relay router for providing a management function; and transmitting a management instruction to the relay router via the management connection, the management instruction carrying the management interface identifier and being configured to manage an electronic device connected to the relay router.

13 Claims, 12 Drawing Sheets

(51) Int. Cl.
*H04W 8/22* (2009.01)
*H04L 25/20* (2006.01)
*H04L 29/06* (2006.01)
*H04L 12/28* (2006.01)

(58) Field of Classification Search
USPC .......................................................... 709/224
See application file for complete search history.

(56) References Cited

U.S. PATENT DOCUMENTS

| | | |
|---|---|---|
| 2003/0146907 A1* | 8/2003 | Boals .................. G06F 3/03545 345/179 |
| 2003/0217136 A1 | 11/2003 | Cho et al. |
| 2005/0003812 A1* | 1/2005 | Gladwin ................. H04L 29/06 455/426.1 |
| 2006/0126536 A1 | 6/2006 | Patel et al. |
| 2006/0143439 A1 | 6/2006 | Arumugam et al. |
| 2007/0191054 A1* | 8/2007 | Das ........................ H04B 7/022 455/525 |
| 2008/0209034 A1 | 8/2008 | Shin et al. |
| 2014/0089383 A1* | 3/2014 | Hong ....................... H04L 67/16 709/203 |

FOREIGN PATENT DOCUMENTS

| | | |
|---|---|---|
| CN | 1776681 A | 5/2006 |
| CN | 1881964 A | 12/2006 |
| CN | 101218790 A | 7/2008 |
| CN | 101296391 A | 10/2008 |
| CN | 101697075 A | 4/2010 |
| CN | 104135443 A | 11/2014 |
| CN | 104539454 A | 4/2015 |
| EP | 2247067 A1 | 11/2010 |
| JP | 2010-141826 A | 6/2010 |
| WO | WO 00/38370 A1 | 6/2000 |
| WO | WO 01/71489 A1 | 9/2001 |

OTHER PUBLICATIONS

Extended European Search Report issued in European Patent Application No. 15197061.3, mailed from the European Patent Office, dated Feb. 10, 2016.

International Search Report of PCT/CN2015/080681, mailed from the State Intellectual Property Office of China dated Sep. 29, 2015.

* cited by examiner

1000

METHODS, APPARATUSES, AND SYSTEM FOR DEVICE MANAGEMENT

CROSS-REFERENCE TO RELATED APPLICATIONS

This application is a continuation of International Application PCT/CN2015/080681, filed Jun. 3, 2015, which is based on and claims priority to Chinese Patent Application No. 201410815619.8, filed Dec. 24, 2014, the entire contents of all of which are incorporated herein by reference.

TECHNICAL FIELD

The present disclosure generally relates to router technology and, more particularly, to methods, apparatuses, and a system for device management.

BACKGROUND

Routers are widely used as gateway devices to provide wireless network access for electronic devices. In certain situations, one router may not provide a complete coverage of wireless network, due to limitations on the signal strength of the router as well as the operation environment of the router. Therefore, a method of routing and relay has been generally adopted. Specifically, a plurality of relay routers, distributed at different locations, are connected to a primary router. The relay routers are configured to amplify wireless signals received from the primary router. Electronic devices far apart from the primary router can access the wireless network by connecting to one of the relay routers. However, when the relay routers are connected to the primary router, users may not be able to logging into the primary router to view and manage electronic devices connected to the relay routers.

SUMMARY

According to a first aspect of the present disclosure, there is provided a device management method for use in a primary router, comprising: establishing a management connection with a relay router; acquiring a management interface identifier from the relay router via the management connection, the management interface identifier being an identifier of an Application Programming Interface (API) in the relay router for providing a management function; and transmitting a management instruction to the relay router via the management connection, the management instruction carrying the management interface identifier and being configured to manage an electronic device connected to the relay router.

According to a second aspect of the present disclosure, there is provided a device management method for use in a relay router, comprising: establishing a management connection with a primary router; providing the primary router with a management interface identifier via the management connection, the management interface identifier being an identifier of an Application Programming Interface (API) in the relay router for providing a management function; receiving a management instruction from the primary router via the management connection, the management instruction carrying the management interface identifier; and managing an electronic device connected to the relay router according to the management instruction.

According to a third aspect of the present disclosure, there is provided an apparatus for device management, comprising: a processor; and a memory for storing instructions executable by the processor; wherein the processor is configured to: establish a management connection with a relay router; acquire a management interface identifier from the relay router via the management connection, the management interface identifier being an identifier of an Application Programming Interface (API) in the relay router for providing a management function; and transmit a management instruction to the relay router via the management connection, the management instruction carrying the management interface identifier and being configured to manage an electronic device connected to the relay router.

According to a fourth aspect of the present disclosure, there is provided an apparatus for device management, comprising: a processor; and a memory for storing instructions executable by the processor; wherein the processor is configured to: establish a management connection with a primary router; provide the primary router with a management interface identifier via the management connection, the management interface identifier being an identifier of an Application Programming Interface (API) in the apparatus for providing a management function; receive a management instruction from the primary router via the management connection, the management instruction carrying the management interface identifier; and manage an electronic device connected to the apparatus according to the management instruction.

According to a fifth aspect of the present disclosure, there is provided a network system, comprising: a primary router; and a relay router connected to the primary router via a wireless or a wired network. The primary router comprises: a first processor; and a first memory for storing first instructions executable by the first processor; wherein the first processor is configured to: establish a management connection with the relay router; acquire a management interface identifier from the relay router via the management connection, the management interface identifier being an identifier of an Application Programming Interface (API) in the relay router for providing a management function; and transmit a management instruction to the relay router via the management connection, the management instruction carrying the management interface identifier and being configured to manage an electronic device connected to the relay router. The relay router comprises: a second processor; and a second memory for storing second instructions executable by the second processor; wherein the second processor is configured to: establish the management connection with the primary router; provide the primary router with the management interface identifier via the management connection; receive the management instruction from the primary router via the management connection; and manage the electronic device connected to the relay router according to the management instruction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the invention as recited in the appended claims.

Figure 1:
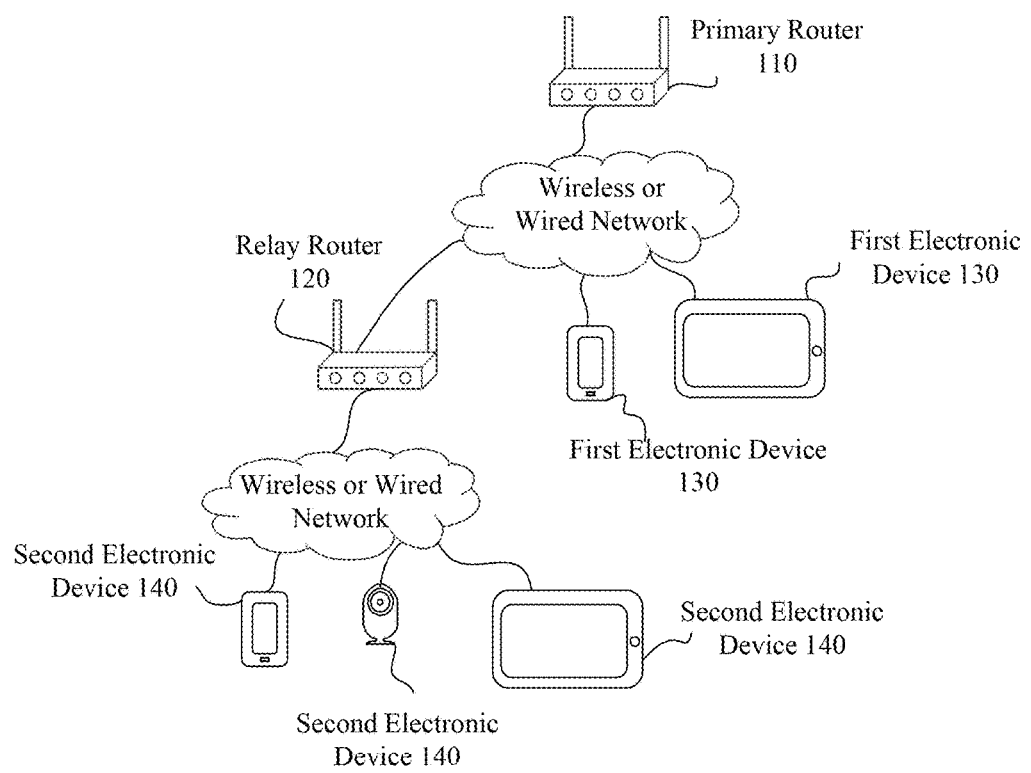
FIG. 1 is a schematic diagram illustrating an implementation environment consistent with exemplary embodiments of the present disclosure.

FIG. 1 is a schematic diagram illustrating an implementation environment 100 consistent with exemplary embodiments of the present disclosure. Referring to FIG. 1, the implementation environment 100 includes a primary router 110, a relay router 120 connected to the primary router 110, at least one first electronic device 130 connected to the primary router 110, and at least one second electronic device 140 connected to the relay router 120.

The primary router 110 may be an electronic device with data processing and data transmission functions. The primary router 110 may be a router, a host enabled to perform a routing function by software, or the like.

The relay router 120 may be an electronic device with data processing and data transmission functions. The relay router 120 may be configured to receive data from the primary router 110 and forward the received data to other electronic devices, such as the second electronic device 140. The relay router 120 may be a router, a host enabled to perform a routing function by software, or the like. The relay router 120 may be connected to the primary router 110 through a wireless or wired network.

The first electronic device 130 may be an electronic device with a function of accessing wireless or wired networks. The first electronic device 130 may be a smart phone, a tablet computer, an e-book reader, an MP3 (Moving Picture Experts Group Audio Layer III) player, an MP4 player, a smart camera, a smart socket, or the like. The first electronic device 130 may be connected to the primary router 110 through a wireless or wired network.

The second electronic device 140 may be an electronic device with a function of accessing wireless or wired networks. The second electronic device 140 may be a smart phone, a tablet computer, an e-book reader, an MP3 player, an MP4 player, a smart camera, a smart socket, or the like. The second electronic device 140 may be connected to the relay router 120 through a wireless or wired network.

Although FIG. 1 shows one primary router 110 and one relay router 120, the present disclosure is not limited by the number of primary routers 110 or relay routers 120. For example, a primary router 110 may be connected to a plurality of relay routers 120, and/or a relay router 120 may be connected to a plurality of other relay routers 120.

Figure 2:
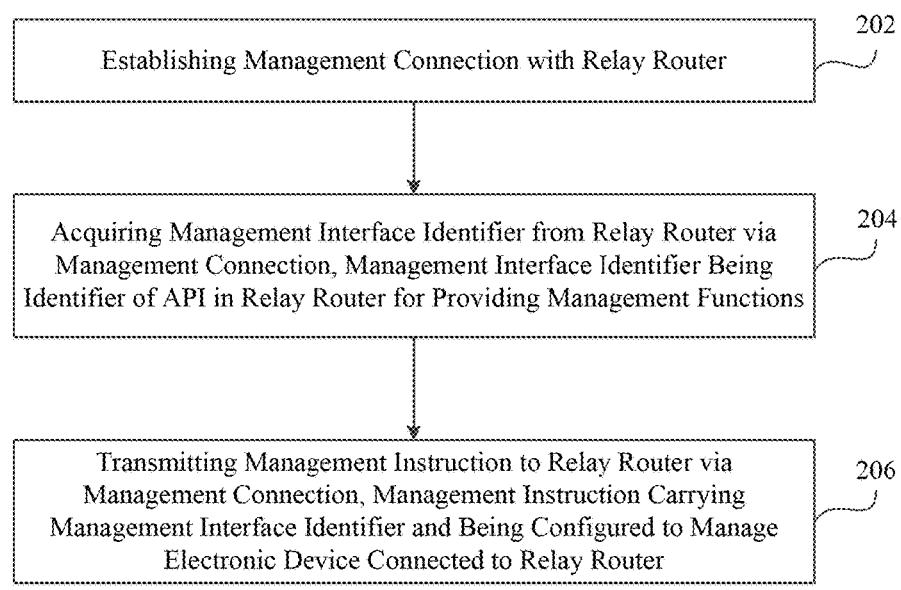
FIG. 2 is a flowchart of a device management method, according to an exemplary embodiment.

FIG. 2 is a flowchart of a device management method 200, according to an exemplary embodiment. For example, the method 200 may be used in a primary router 110 (FIG. 1). Referring to FIG. 2, the method 200 may include the following steps.

In step 202, the primary router 110 establishes a management connection with a relay router 120 (FIG. 1).

In step 204, the primary router 110 acquires a management interface identifier from the relay router 120 via the management connection. For example, the management interface identifier is an identifier of an Application Programming Interface (API) in the relay router 120. The API is used for providing management functions.

In step 206, the primary router 110 transmits a management instruction to the relay router 120 via the management connection. The management instruction carries the management interface identifier and is configured to manage a second electronic device 140 connected to the relay router 120.

Figure 3:
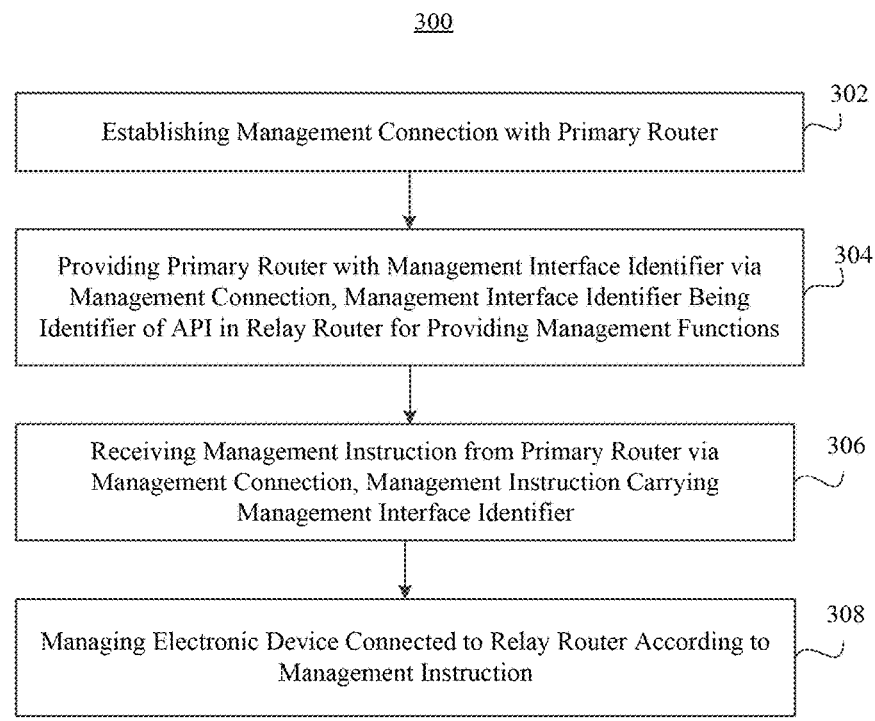
FIG. 3 is a flowchart of a device management method, according to an exemplary embodiment.

FIG. 3 is a flowchart of a device management method 300, according to an exemplary embodiment. For example, the method 300 may be used in a relay router 120 (FIG. 1). Referring to FIG. 3, the method 300 may include the following steps.

In step 302, the relay router 120 establishes a management connection with a primary router 110 (FIG. 1).

In step 304, the relay router 120 provides the primary router 110 with a management interface identifier via the management connection. For example, the management interface identifier is an identifier of an API in the relay router 120. The API is used for providing management functions.

In step 306, the relay router 120 receives a management instruction transmitted from the primary router 110 via the management connection. The management instruction carries the management interface identifier.

In step 308, the relay router 120 manages a second electronic device 140 connected to the relay router 120 according to the management instruction.

The methods 200 and 300 solve the problem that, when there is at least one relay router connected to a primary router, a user cannot log into the primary router to view and manage electronic devices connected to the relay router. That is, the methods 200 and 300 allow the user to manage the electronic devices connected to the relay router through the primary router, and thus improves the efficiency of managing these electronic devices.

Figure 4A:
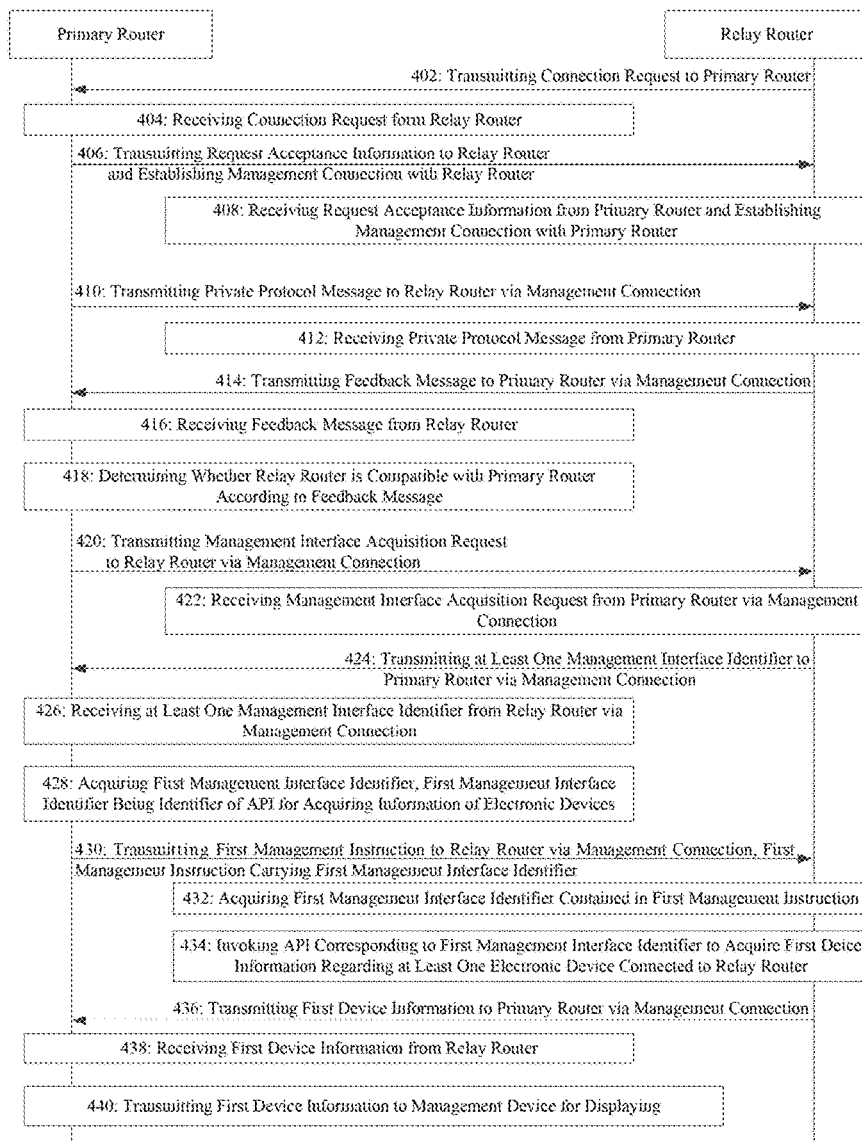
FIG. 4A is a flowchart of a device management method, according to an exemplary embodiment.

FIG. 4A is a flowchart of a device management method 400, according to an exemplary embodiment. For example, the method 400 may be used in the implementation environment 100 (FIG. 1). Referring to FIGS. 1 and 4A, the method 400 may include the following steps.

In step 402, the relay router 120 transmits a connection request to the primary router 110.

A user may use a management device to log into an administration interface of the relay router 120. In the administration interface, the user may activate the routing and relay functions of the relay router 120 to search for nearby primary routers. When the primary router 110 is found, the relay router 120 may display in the administration interface a prompt requesting the user to input a password for connecting to the primary router 110. After the user enters the password in the administration interface, the relay router 120 sends the password to the primary router 110 for verification. If the verification succeeds, the relay router 120 is connected to a wireless network provided by the primary router 110.

To ensure the security of managing the second electronic devices 140 connected to the relay router 120, after being connected to the wireless network provided by the primary router 110, the relay router 120 may initiate a connection request to a predetermined Transmission Control Protocol (TCP) port of the primary router 110, to request for establishing a management connection with the TCP port. The TCP port may be a port 80. Moreover, the management connection may be a persistent connection. Furthermore, since connection requests received by the primary router 110 may be transmitted from a plurality of relay routers, not just the relay router 120, the connection request may contain identification information of the relay router for the primary router 110 to identify the relay routers.

In step 404, the primary router 110 receives the connection request form the relay router 120.

In step 406, the primary router 110 transmits request acceptance information to the relay router 120 and establishes a management connection with the relay router 120.

The primary router 110 acquires the identification information of the relay router 120 carried in the connection request, and detects whether the relay router 120 has been connected to the primary router 110 according to the identification information. If the relay router 120 has been connected to the primary router 110, the primary router 110 may accept the connection request, establish the management connection with the relay router 120 through the predetermined TCP port, and transmit the request acceptance information to the relay router 120 to notify the relay router 120 of the availability of the primary router 110 for establishing the management connection.

In step 408, the relay router 120 receives the request acceptance information from the primary router 110 and establishes the management connection with the primary router 110.

Upon reception of the request acceptance information from the primary router 110, the relay router 120 establishes the management connection through the predetermined TCP port of the primary router 110. The establishment of the management connection between the relay router 110 and the primary router 120 may follow a three-way handshake protocol of TCP. After the management connection is established, the relay router 120 may be required to transmit connection establishment information to the primary router 110, to notify the primary router 110 of the establishment.

After the management connection is established, the relay router 120 may grant management authority to the primary router 110, treating the primary router 110 as a trustable device and instructions and/or data transmitted via the management connection as being secured.

If there is a plurality of relay routers connected with the primary router 110, the primary router 110 may establish a management connection with each of the plurality of relay routers. The present disclosure is not limited by the number of relay routers or the number of management connections.

In step 410, the primary router 110 transmits a private protocol message to the relay router 120 via the management connection.

After the establishment of the management connection, the primary router 110 transmits a private protocol message to the relay router 120 via the management connection. The private protocol message is configured to prompt the relay router 120 to send a feedback message to the primary router 110. The feedback message may include, but not limited to, a version number and/or a message transmission format of the relay router 120.

In step 412, the relay router 120 receives the private protocol message from the primary router 120.

In step 414, the relay router 120 transmits a feedback message to the primary router 110 via the management connection.

According to the received private protocol message, the relay router 120 acquires its own information, such as current version number of the relay router 120, current message transmission format of the relay router 120, etc. The relay router 120 then packages the acquired information into a feedback message, and transmits the feedback message to the primary router 110 via the management connection.

In step 416, the primary router 110 receives the feedback message from the relay router 120.

In step 418, the primary router 110 determines whether the relay router 120 is compatible with the primary router 110 according to the feedback message.

The primary router 110 may pre-store the information of compatible versions in the form of, for example, a compatible version information table as shown by Table 1.

TABLE 1

| Version Number | Message Transmission Format |
|---|---|
| Version A | Format A |
| Version B | Format B |

The primary router 110 looks up the compatible version information table to determine whether any item in the table matches the information carried in the feedback message. If a match is found, the primary router 110 determines that the relay router 120 is compatible with the primary router 110, and proceeds to step 420. If no match is found, the primary router 110 determines that the relay router 120 is not compatible with the primary router 110, and thus the primary router 110 cannot manage the second electronic devices 140 connected to the relay router 120.

In step 420, the primary router 110 transmits a management interface acquisition request to the relay router 120 via the management connection.

The relay router 120 may have at least one management interface, which may be an API interface. Different management interfaces provide different management functions, such as information acquisition, black and white list, timing switch, access restriction, and the like. The relay router 120 may manage the second electronic devices 140 by invoking the various management interfaces.

For example, for a management interface providing information acquisition functions, the relay router 120 may invoke the management interface to acquire certain information regarding the second electronic devices 140, such as device information, connection status information, operation status information, and the like.

Also for example, for a management interface providing access restriction functions, the relay router may invoke the management interface to disable the Internet accessibility of some or all of the second electronic devices 140.

To manage the second electronic devices 140, the primary router 110 generally needs to know the management interfaces provided by the replay router 120. Therefore, the primary router 110 transmits the management interface acquisition request to the relay router 120 to request for a management interface identifier. In exemplary embodiments, since different relay routers provide different management interfaces, when multiple relay routers are connected to the primary router 110, the primary router 110 may send a management interface acquisition request to each relay router.

In step 422, the relay router 120 receives the management interface acquisition request from the primary router 110 via the management connection.

In step 424, the relay router 120 transmits at least one management interface identifier to the primary router 110 via the management connection.

Because the management interface acquisition request is transmitted via the management connection, the relay router 120 considers the request as a safe message. The relay router 120 may pre-store a corresponding relationship between management interface identifiers and management interfaces in the form of, for example, an interface identifier table as shown by Table 2.

TABLE 2

| Management Interface Identifier | Management Interface |
|---|---|
| Management Interface A | API for Acquiring Information |
| Management Interface B | API for Setting Black and White Lists |
| Management Interface C | API for Timing Switch |
| Management Interface D | API for Access Restriction |

Referring to Table 2, the management interface identifier may be an identifier of an API in the relay router 120 for providing the management functions. According to the received management interface acquisition request, the relay router 120 acquires at least one management interface identifier and transmits the identifier to the primary router via the management connection.

In step 426, the primary router 110 receives the at least one management interface identifier from the relay router 120 via the management connection.

For future usage, the primary router 110 saves the received management interface identifier and records a corresponding relationship between the management interface identifier and the relay router 120. If the primary router 110 receives management interface identifiers from a plurality of relay routers, the corresponding relation between the management interface identifiers and the plurality of relay routers may be, for example, stored in a table as shown by Table 3.

TABLE 3

| Relay Router Identifier | Management Interface Identifier |
|---|---|
| Relay Router 1 | Management Interface A, Management Interface B, Management Interface C, Management Interface D |
| Relay Router 2 | Management Interface A, Management Interface B, |

TABLE 3-continued

| Relay Router Identifier | Management Interface Identifier |
|---|---|
| | Management interface C |
| Relay Router 3 | Management Interface A, Management Interface C |

By receiving the at least one management interface identifier, the primary router 110 acquires the management authority of the relay router 120, and thus is able to manage the second electronic devices 140 via the management connection.

In step 428, the primary router 110 acquires a first management interface identifier. The first management interface identifier is an identifier of the API for acquiring information of the second electronic devices 140.

If a user intends to manage the second electronic devices 140 through the primary router 110, the user may use a management device to access the primary router 110. The user may enter a username and a password to log into an administration interface of the primary router 110. In the administration interface, the user may give various instructions to the primary router 110. Based on the user instructions, the primary router 110 may search for a corresponding management interface identifier, for example, in Table 3.

For example, if the user intends to acquire information of the second electronic devices 140, the user may give a corresponding instruction to the primary router 110 through the management device. Accordingly, the primary router 110 may search for an identifier of the API for acquiring information of the second electronic devices 140, i.e., the first interface identifier, among the stored management interface identifiers.

If a plurality of relay routers are connected to the primary router 110, the primary router 110 may first determine the relay router to be managed and then acquire the management interface identifier corresponding to the determined relay router.

In step 430, the primary router 110 transmits a first management instruction to the relay router 120 via the management connection. The first management instruction carries the first management interface identifier.

In step 432, the relay router 120 acquires the first management interface identifier contained in the first management instruction. The first management interface identifier is used by the relay router 120 to determine the API for acquiring the information of the second electronic devices 140.

In step 434, the relay router 120 invokes the API corresponding to the first management interface identifier to acquire first device information regarding at least one second electronic device 140.

The first device information may include, but not limited to, a Media Access Control (MAC) address, an Internet Protocol (IP) address, and connection status information of the second electronic device 140. The connection status information indicates whether the second electronic device 140 is online, the time for which the second electronic device 140 has been connected to the relay router 120, the volumes of the received and sent data by the second electronic device 140, and the like.

If the relay router 120 has authority to manage the second electronic devices 140, the relay router 120 may also acquire the data acquired by the second electronic devices 140 and information regarding the current operation condition the second electronic devices 140. The relay router 120 may further include the above information in the first device information.

For example, the relay router 120 may have management authority of an air purifier connected thereto. Accordingly, the relay router 120 may acquire current air quality data collected by the air purifier and the information on the current operation mode of the air purifier, and transmit the acquired information to the primary router 110 via the management connection.

In step 436, the relay router 120 transmits the first device information to the primary router 110 via the management connection.

It should be noted that, upon connection/disconnection of a second electronic device 140 to/from the relay router 120, the relay router 120 may transmit the latest first device information to the primary router 110 via the management connection, prompting the primary router 110 to update the first device information.

In step 438, the primary router 110 receives the first device information from the relay router 120.

In step 440, the primary router 110 transmits the first device information to the management device for displaying.

To enable the user to know information of both the first electronic devices 130 connected to the primary router 110 and the second electronic devices 140 connected to the relay router 120, step 440 may further include the following sub-steps.

In the first sub-step, the primary router 110 acquires second device information regarding at least one first electronic device 130.

Similar to the first device information, the second device information may include, but not limited to, a MAC address, an IP address, and connection status information of the first electronic device 130. The connection status information indicates whether the first electronic device 130 is online, the time for which the first electronic device 130 has been connected to the primary router 110, the volumes of the data received and sent by the first electronic device 130, and the like.

In the second sub-step, the primary router 110 transmits the first and second device information to the management device.

The management device may display the received first and second device information. To indicate whether an electronic device is connected to the primary router 110 or the relay router 120, the primary router 110 may add identifiers of the respective routers to the first and second device information. The management device may classify the first and second device information according to the identifiers of routers, thus enabling the user to understand the connection condition of each electronic device.

Figure 4B:
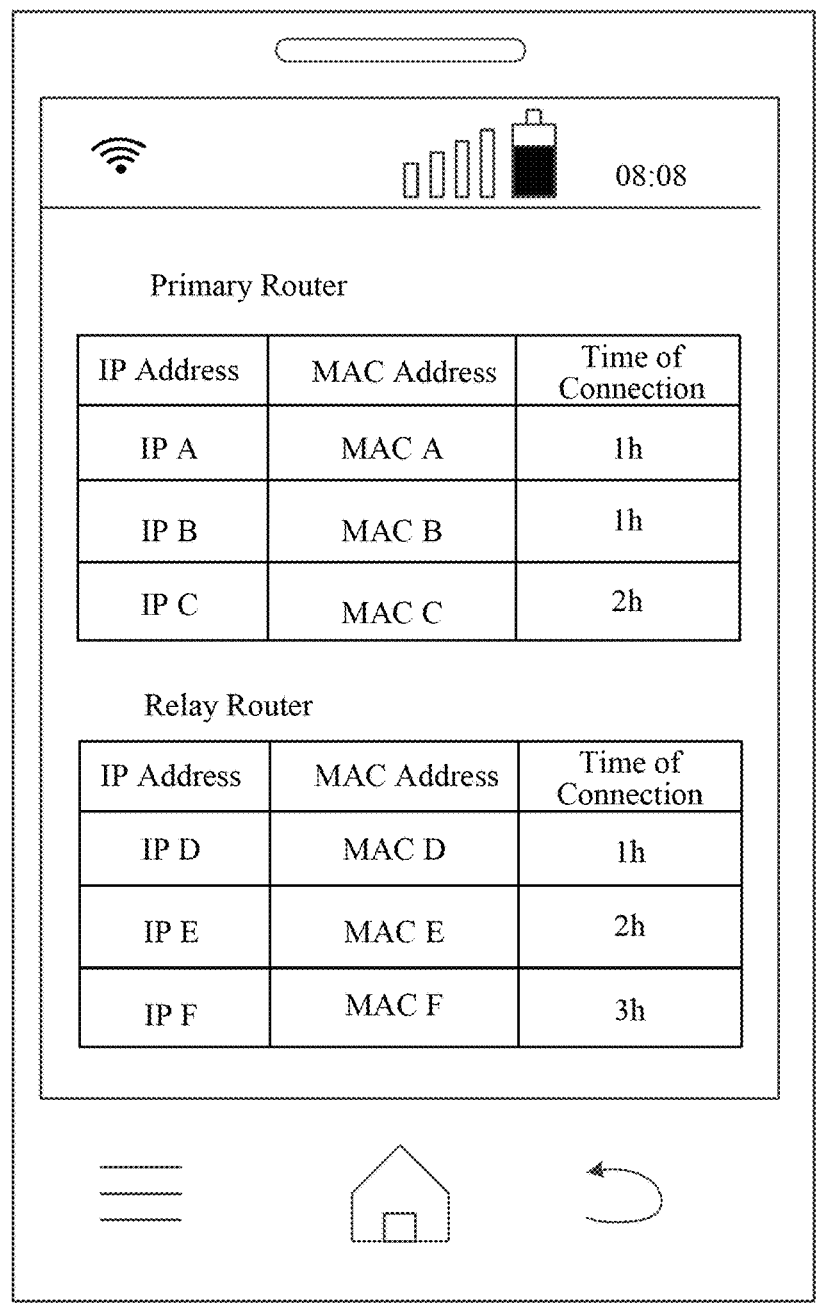
FIG. 4B is a schematic diagram illustrating device information displayed by a management device, according to an exemplary embodiment.

FIG. 4B is a schematic diagram illustrating the first and second device information displayed by the management device, according to an exemplary embodiment. Referring to the example shown in FIG. 4B, the first and second device information are displayed in the form of a list.

Figure 4C:
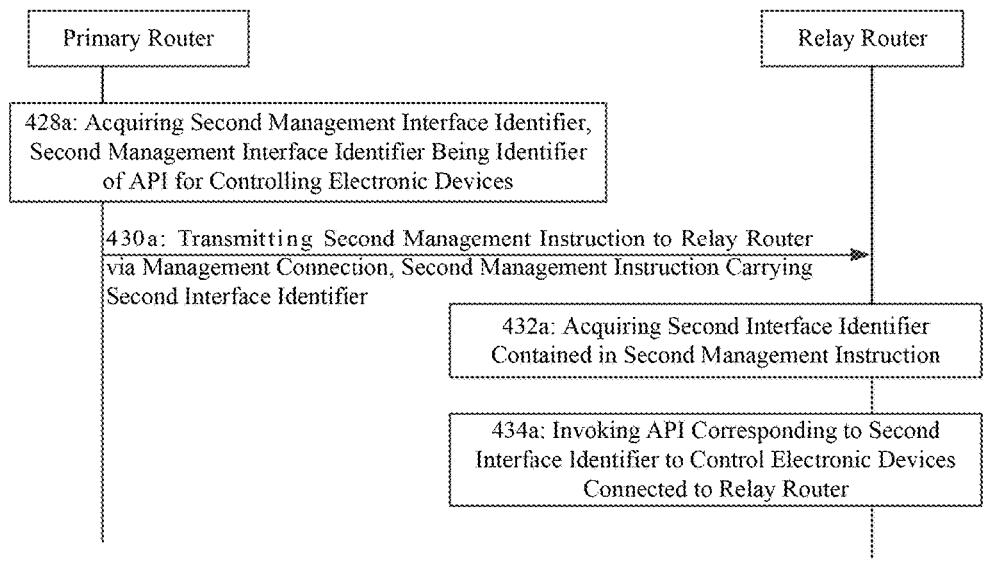
FIG. 4C is a flowchart of a device management method, according to an exemplary embodiment.

Because different management interfaces correspond to different management functions, if the management interface identifiers provided by the relay router 120 to the primary router 110 include an identifier of an API for controlling electronic devices, the primary router 110 may send a management instruction carrying the identifier to the relay router 120 via the management connection, so as to control the second electronic devices 140 connected to the relay router 120. As shown by the flowchart in FIG. 4C, steps 428-440 in the method 400 may be replaced by the following steps 428a-434a to control the second electronic devices 140.

In step 428a, the primary router 110 acquires a second management interface identifier. The second management identifier is an identifier of an API for controlling electronic devices.

For example, the management interface identifiers provide by the relay router 120 may include an identifier of an API for controlling a smart socket connected to the relay router 120. If a user intends to set the power on/off state of the smart socket through the primary router 110, the user may issue a corresponding instruction to the primary router 110 via the management connection. The primary router 110 may then search for the identifier of the API for controlling the smart socket among the management interface identifiers, and set the found identifier as the second management interface identifier.

In step 430a, the primary router 110 transmits a second management instruction to the relay router 120 via the management connection. The second management instruction carries the second management interface identifier.

The second management instruction may also include an identifier of the second electronic device 140, for example, a MAC address thereof, that the user intends to control. The relay router 120 may control the second electronic device 140 according to the identifier.

In step 432a, the relay router 120 acquires the second management interface identifier contained in the second management instruction.

The relay router 120 may determine the API for controlling the second electronic device 140 according to the second management interface identifier. For example, the second management interface identifier may be the identifier of an API for controlling a smart socket.

In step 434a, the relay router 120 invokes the API corresponding to the second management interface identifier, so as to control the second electronic device 140.

The second management instruction may also include an identifier of the electronic device 140. The relay router 120 may manage the second electronic device 140 corresponding to the identifier by invoking the API corresponding to the second management interface identifier.

For example, if the user intends to control a particular smart socket A, the second management instruction may include the identifier of the API for controlling smart socket A as well as a MAC address of smart socket A. The relay router 120 may invoke the API to control smart socket A identified by the MAC address.

Figure 5:
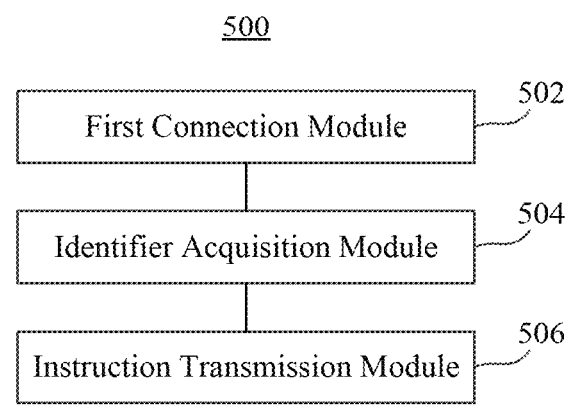
FIG. 5 is a block diagram of an apparatus for device management, according to an exemplary embodiment.

FIG. 5 is a block diagram of an apparatus 500 for device management, according to an exemplary embodiment. For example, the apparatus 500 may be implemented as a part or whole of a primary router 110 (FIG. 1) by means of software, hardware, or a combination thereof. Referring to FIG. 5, the apparatus 500 may include a first connection module 502, an identifier acquisition module 504, and an instruction transmission module 506.

The first connection module 502 is configured to establish a management connection with a relay router 120 (FIG. 1). The identifier acquisition module 504 is configured to acquire a management interface identifier from the relay router via the management connection. The management interface identifier is an identifier of an API in the relay router 120. The API is used for providing management functions. The instruction transmission module 506 is configured to transmit a management instruction to the relay router 120 via the management connection. The management instruction carries the management interface identifier and is configured to manage a second electronic device 140 connected to the relay router 120.

Figure 6:
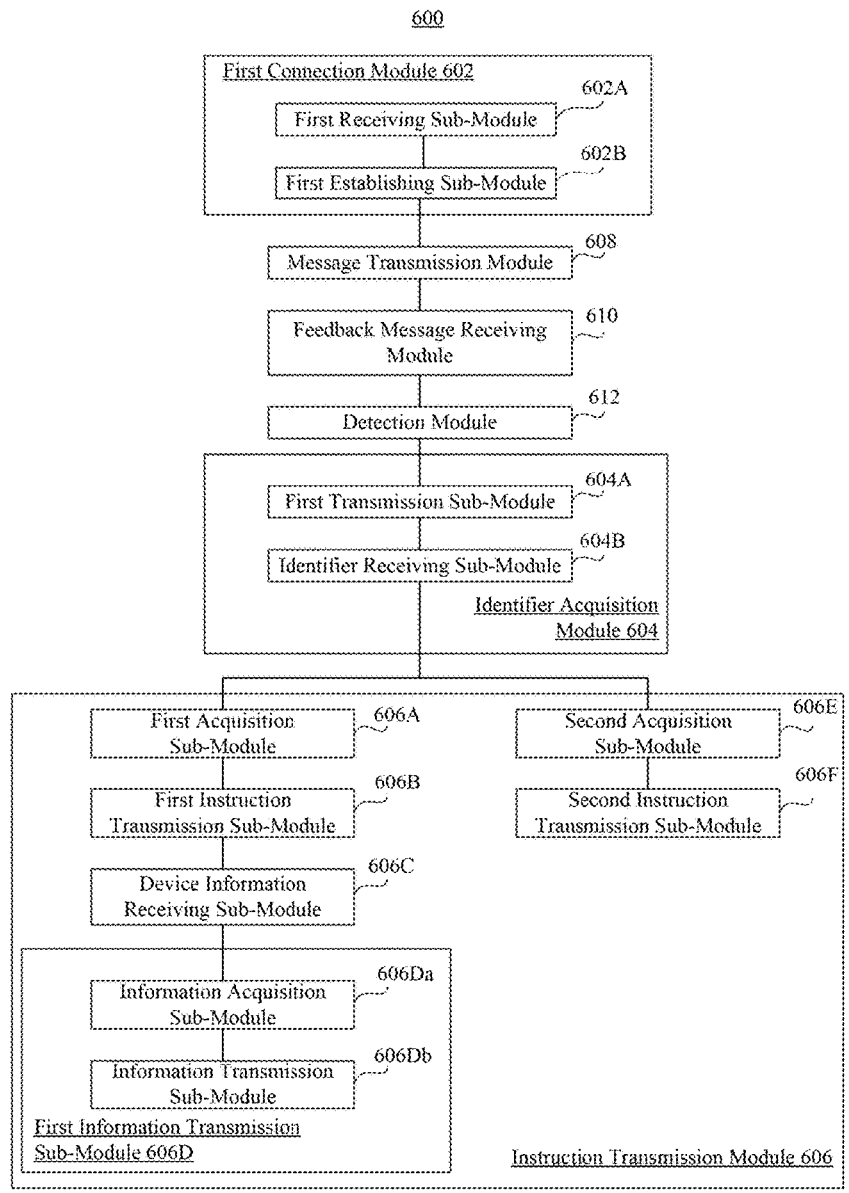
FIG. 6 is a block diagram of an apparatus for device management, according to an exemplary embodiment.

FIG. 6 is a block diagram of an apparatus 600 for device management, according to an exemplary embodiment. For example, the apparatus 600 may be implemented as a part or whole of a primary router 110 (FIG. 1) by means of software, hardware, or a combination thereof. Referring to FIG. 6, the apparatus 600 may include a first connection module 602, an identifier acquisition module 604, and an instruction transmission module 606, similar to the first connection module 502, the identifier acquisition module 504, and the instruction transmission module 506 (FIG. 5).

In some exemplary embodiments, the first connection module 602 may further include a first receiving sub-module 602A and a first establishing sub-module 602B. The first receiving sub-module 602A is configured to receive a connection request from the relay router 120. The first establishing sub-module 602B is configured to transmit request acceptance information to the relay router 120 and establish the management connection with the relay router 120.

In some exemplary embodiments, the identifier acquisition module 604 may further include a first transmission sub-module 604A and an identifier receiving sub-module 604B. The first transmission sub-module 604A is configured to transmit a management interface acquisition request to the relay router 120 via the management connection. The identifier receiving sub-module 604B is configured to receive at least one management interface identifier from the relay router 120 via the management connection.

In some exemplary embodiments, the apparatus 600 may further include a message transmission module 608, a feedback message receiving module 610, and a detection module 612. The message transmission module 608 is configured to transmit a private protocol message to the relay router 120 via the management connection. The feedback message receiving module 610 is configured to receive a feedback message from the relay router 120. The detection module 612 is configured to determine whether the relay router 120 is compatible with the primary router 110 according to the feedback message. The detection module 608 is further configured to, if the relay router 120 is compatible with the primary router 110, acquire a management interface identifier from the relay router 120 via the management connection.

In some exemplary embodiments, the instruction transmission module 606 may further include a first acquisition sub-module 606A, a first instruction transmission sub-module 606B, a device information receiving sub-module 606C, and a first information transmission sub-module 606D. The first acquisition sub-module 606A is configured to acquire a first management interface identifier. The first management interface identifier is an identifier of an API for acquiring the information of an electronic device. The first instruction transmission sub-module 606B is configured to transmit a first management instruction to the relay router 120 via the management connection. The first management instruction carries the first management interface identifier. The relay router 120 may invoke the API corresponding to the first management interface identifier to acquire first device information regarding at least one second electronic device 140 connected to the relay router 120. The device information receiving sub-module 606C is configured to receive the first device information from the relay router 120. The first information transmission sub-module 606D is configured to transmit the first device information to a management device for displaying.

In some exemplary embodiments, the instruction transmission module 606 may further include a second acquisition sub-module 606E and a second instruction transmission sub-module 606F. The second acquisition sub-module 606E is configured to acquire a second management interface identifier. The second interface identifier is an identifier of an API for controlling an electronic device. The second instruction transmission sub-module 606F is configured to transmit a second management instruction to the relay router 120 via the management connection. The second management instruction carries the second interface identifier. The relay router 120 may invoke the API corresponding to the second interface identifier to control a second electronic device 140 connected to the relay router 120.

In some exemplary embodiments, the first information transmission sub-module 606D may further include an information acquisition sub-module 606 Da and an information transmission sub-module 606Db. The information acquisition sub-module 606 Da is configured to acquire second device information regarding at least one first electronic device 130 connected to the primary router 110. The information transmission sub-module 606Db is configured to transmit the first device information and the second device information to the management device. The first device information includes at least one of a MAC address, an IP address, and connection status information of the second electronic device 140. The second device information includes at least one of a MAC address, an IP address, and connection status information of the first electronic device 130.

Figure 7:
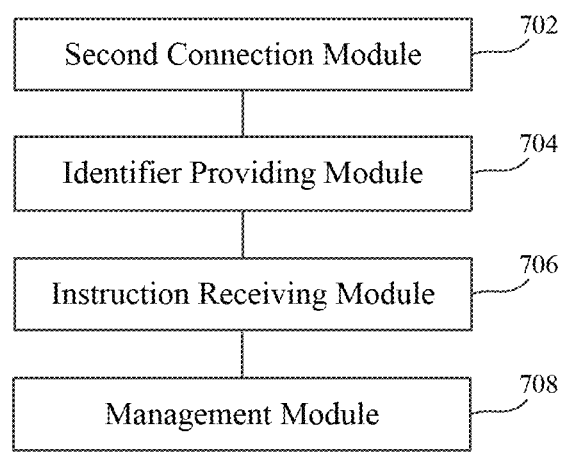
FIG. 7 is a block diagram of an apparatus for device management, according to an exemplary embodiment.

FIG. 7 is a block diagram of an apparatus 700 for device management, according to an exemplary embodiment. For example, the apparatus 700 may be implemented as a part or whole of a relay router 120 (FIG. 1) by means of software, hardware, or a combination thereof. Referring to FIG. 7, the apparatus 700 may include a second connection module 702, an identifier providing module 704, an instruction receiving module 706, and a management module 708.

The second connection module 702 is configured to establish a management connection with a primary router 110. The identifier providing module 704 is configured to provide the primary router 110 with a management interface identifier via the management connection. The management interface identifier is an identifier of an API in the relay router 120. The API is used for providing management function. The instruction receiving module 706 is configured to receive a management instruction sent by the primary router 110 via the management connection. The management instruction carries the management interface identifier. The management module 708 is configured to manage a second electronic device 140 connected to the relay router 120, according to the management instruction.

Figure 8:
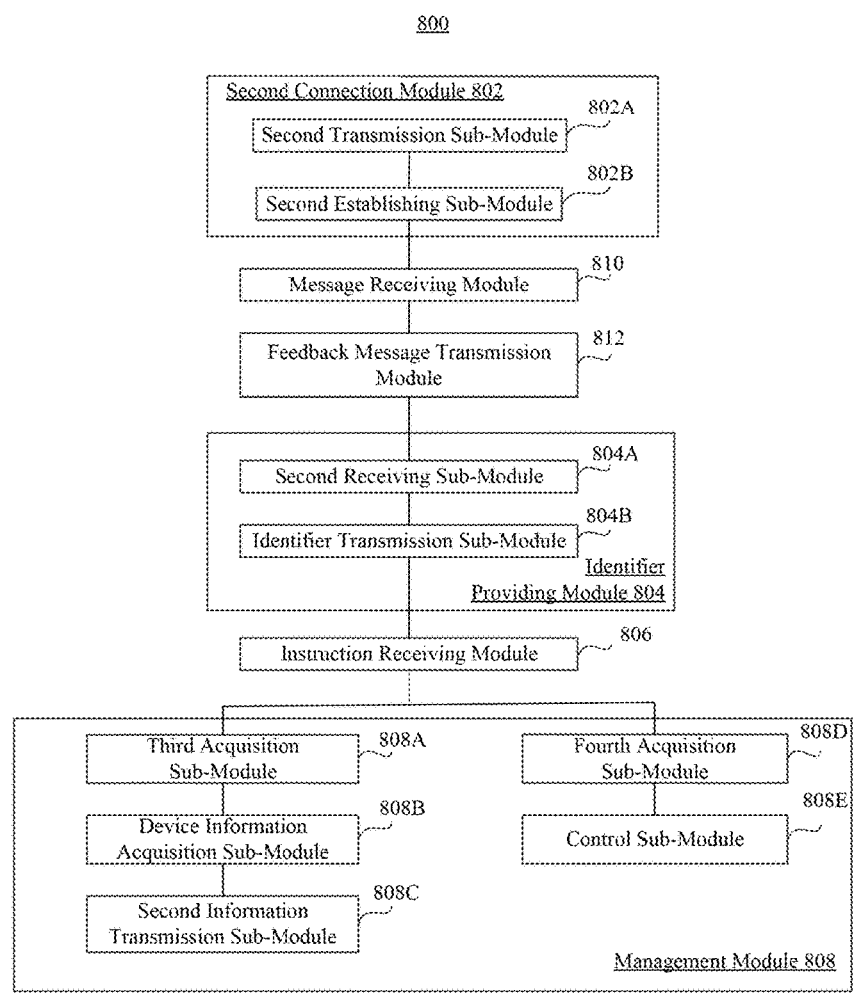
FIG. 8 is a block diagram of an apparatus for device management, according to an exemplary embodiment.

FIG. 8 is a block diagram of an apparatus 800 for device management, according to an exemplary embodiment. For example, the apparatus 800 may be implemented as a part or whole of a relay router 120 (FIG. 1) by means of software, hardware or a combination thereof. The apparatus 800 may include a second connection module 802, an identifier providing module 804, an instruction receiving module 806, and a management module 808, similar to the second connection module 702, the identifier providing module 704, the instruction receiving module 706, and the management module 708 (FIG. 7).

In some exemplary embodiments, the second connection module 802 may further include a second transmission sub-module 802A and a second establishing sub-module 802B. The second transmission sub-module 802A is configured to transmit a connection request to a primary router 110. The second establishing sub-module 802B is configured to receive request acceptance information sent by the primary router 110 and establish a management connection with the primary router 110.

In some exemplary embodiments, the identifier providing module 804 may further include a second receiving sub-module 804A and an identifier transmission sub-module 804B. The second receiving sub-module 804A is configured to receive a management interface acquisition request from the primary router via the management connection. The management interface acquisition request is sent by the primary router 110 after the primary router 110 determines that is compatible with the relay router 120. The identifier transmission sub-module 804B is configured to transmit at least one management interface identifier to the primary router 110 via the management connection.

In some exemplary embodiments, the apparatus 800 may further include a message receiving module 810 and a feedback message transmission module 812. The message receiving module 810 is configured to receive a private protocol message from the primary router 110. The feedback message transmission module 812 is configured to transmit a feedback message to the primary router 110 via the management connection. The primary router 110 may determine whether the primary router 110 is compatible with the relay router 120 according to the feedback message.

In some exemplary embodiments, the management module 808 may further include a third acquisition sub-module 808A, a device information acquisition sub-module 808B, and a second information transmission sub-module 808C. The third acquisition sub-module 808A is configured to acquire a first management interface identifier contained in a first management instruction. The first management interface identifier is an identifier of an API for acquiring information of an electronic device. The device information acquisition sub-module 808B is configured to invoke the API corresponding to the first interface identifier to acquire information of at least one second electronic device 140 connected to the relay router 120. The acquired device information is first device information. The second information transmission sub-module 808C is configured to transmit the first device information to the primary router 110 via the management connection. The first device information includes at least one of a MAC address, an IP address, and connection status information of the second electronic device 140.

In some exemplary embodiments, the management module 808 may further include a fourth acquisition sub-module 808D and a control sub-module 808E. The fourth acquisition sub-module 808D is configured to acquire a second management interface identifier. The second interface identifier is an identifier of an API for controlling an electronic device. The control sub-module 808E is configured to invoke the API corresponding to the second interface identifier to control the second electronic device 140.

Figure 9:
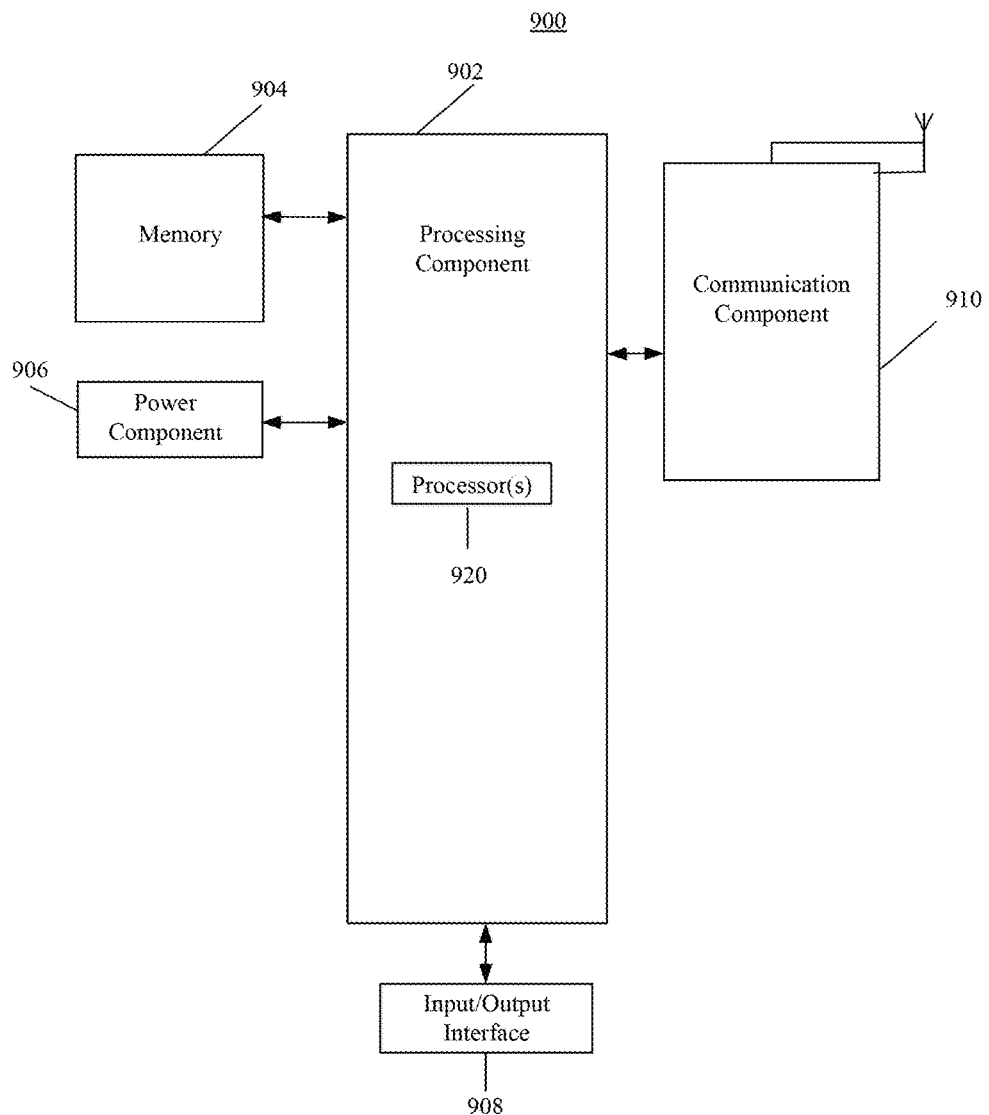
FIG. 9 is a block diagram of an apparatus for device management, according to an exemplary embodiment.

FIG. 9 is a block diagram of an apparatus 900 for device management, according to an exemplary embodiment. For example, the apparatus 900 may be a primary router 110 or a relay router 120 (FIG. 1). Referring to FIG. 9, the apparatus 900 may include one or more of the following components: a processing component 902, a memory 904, a power component 906, an input/output (I/O) interface 908, and a communication component 910.

The processing component 902 typically controls overall operations of the apparatus 900. The processing component 902 may include one or more processors 920 to execute instructions to perform all or part of the steps in the above described methods. Moreover, the processing component 902 may include one or more modules which facilitate the interaction between the processing component 902 and other components.

The memory 904 is configured to store various types of data to support the operation of the apparatus 900. Examples of such data include instructions for any applications or methods operated on the apparatus 900. The memory 904 may be implemented using any type of volatile or non-volatile memory apparatuss, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The I/O interface 908 provides an interface between the processing component 902 and peripheral interface modules.

The communication component 910 is configured to facilitate communication, wired or wirelessly, between the apparatus 900 and other apparatuses. In one exemplary embodiment, the communication component 910 receives a broadcast signal or broadcast associated information from an external broadcast management system via a broadcast channel. In one exemplary embodiment, the communication component 910 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing apparatuss (DSPDs), programmable logic apparatuss (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the apparatus 900, for performing the above-described methods. For example, the non-transitory computer-readable storage medium may be a read-only memory (ROM), a random access memory (RAM), a CD-ROM, a magnetic tape, a floppy disc, an optical data storage apparatus, and the like.

Figure 10:
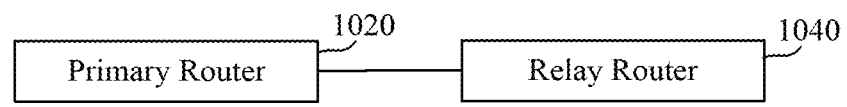
FIG. 10 is a block diagram of a network system, according to an exemplary embodiment.

FIG. 10 is a block diagram of a network system 1000, according to an exemplary embodiment. Referring to FIG. 10, the network system 100 may include a primary router 1020 and a relay router 1040. The relay router 1040 is connected to the primary router 1020 through a wireless or a wired network. The primary router 1020 may include an apparatus for device management, such as the apparatus 500 (FIG. 5) and 600 (FIG. 6). The relay router 1040 may include an apparatus for device management, such as the apparatus 700 (FIG. 7) and 800 (FIG. 8).

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of sub-modules.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention only be limited by the appended claims.

What is claimed is:

1. A device management method for use in a primary router, comprising:
   establishing a management connection with a relay router;
   acquiring a management interface identifier from the relay router via the management connection, the management interface identifier being an identifier of an Application Programming Interface (API) in the relay router for providing a management function; and
   transmitting a management instruction to the relay router via the management connection, the management instruction carrying the management interface identifier and being configured to manage an electronic device connected to the relay router,
   wherein both the primary router and the relay router are configured to provide wireless network access for electronic devices connected thereto, and
   wherein the acquiring of the management interface identifier from the relay router via the management connection comprises:
   transmitting a private protocol message to the relay router via the management connection;
   receiving a feedback message transmitted from the relay router;
   determining whether the relay router is compatible with the primary router according to the feedback message; and
   if the relay router is compatible with the primary router, acquiring the management interface identifier from the relay router via the management connection.

2. The method according to claim 1, wherein the establishing of the management connection with the relay router comprises:
   receiving a connection request from the relay router; and
   transmitting request acceptance information to the relay router and establishing the management connection with the relay router.

3. The method according to claim 1, wherein the acquiring of the management interface identifier from the relay router via the management connection comprises:
   transmitting a management interface acquisition request to the relay router via the management connection; and
   receiving at least one management interface identifier from the relay router via the management connection.

4. The method according to claim 1, wherein:
   the management interface identifier corresponds to an API for acquiring information regarding the electronic device connected to the relay router; and
   the transmitting of the management instruction to the relay router via the management connection comprises:
   transmitting the management instruction to the relay router via the management connection, wherein the relay router is configured to acquire the management interface identifier in the management instruction and invoke the API corresponding to the management interface identifier to obtain first device information regarding the electronic device connected to the relay router;
   receiving the first device information from the relay router; and
   transmitting the first device information to a management device for displaying.

5. The method according to claim 1, wherein:
   the management interface identifier corresponds to an API for controlling the electronic device connected to the relay router; and
   the transmitting of the management instruction to the relay router via the management connection comprises:
   transmitting the management instruction to the relay router via the management connection, wherein the relay router is configured to acquire the management interface identifier in the management instruction and invoke the API corresponding to the management interface identifier to control the electronic device connected to the relay router.

6. The method according to claim 4, further comprising:
   acquiring second device information regarding an electronic device connected to the primary router; and
   transmitting the first device information and the second device information to the management device;
   wherein the first device information includes at least one of a Media Access Control (MAC) address, an Internet Protocol (IP) address, or connection status information of the electronic device connected to the relay router; and
   the second device information includes at least one of a MAC address, an IP address, or connection status information of the electronic device connected to the primary router.

7. A device management method for use in a relay router, comprising:
   establishing a management connection with a primary router;
   providing the primary router with a management interface identifier via the management connection, the management interface identifier being an identifier of an Application Programming Interface (API) in the relay router for providing a management function;
   receiving a management instruction from the primary router via the management connection, the management instruction carrying the management interface identifier; and
   managing an electronic device connected to the relay router according to the management instruction,
   wherein both the primary router and the relay router are configured to provide wireless network access for electronic devices connected thereto, and wherein the providing of the primary router with the management interface identifier via the management connection comprises:
receiving a private protocol message from the primary router via the management connection;
transmitting a feedback message to the primary router, for the primary router to determine whether the relay router is compatible with the primary router according to the feedback message; and
providing the management interface identifier to the primary router via the management connection if the relay router is compatible with the primary router.

8. The method according to claim 7, wherein the providing of the primary router with the management interface identifier via the management connection comprises:
receiving a management interface acquisition request from the primary router via the management connection, wherein the primary router transmits the management interface acquisition request to the relay router after determining that the primary router is compatible with the relay router; and
transmitting at least one management interface identifier to the primary router via the management connection.

9. The method according to claim 7, wherein:
the management interface identifier corresponds to an API for acquiring information regarding the electronic device connected to the relay router; and
the managing of the electronic device connected to the relay router according to the management instruction comprises:
invoking the API corresponding to the management interface identifier to obtain first device information regarding the electronic device connected to the relay router, the first information including at least one of a Media Access Control (MAC) address, an Internet Protocol (IP) address, or connection status information of the electronic device; and
transmitting the first device information to the primary router via the management connection.

10. The method according to claim 7, wherein:
the management interface identifier corresponds to an API for controlling the electronic device connected to the relay router; and
the managing of the electronic device connected to the relay router according to the management instruction comprises:
invoking the API corresponding to the management interface identifier to control the electronic device connected to the relay router.

11. An apparatus for device management, comprising:
a processor; and
a memory for storing instructions executable by the processor;
wherein the processor is configured to:
establish a management connection with a relay router;
acquire a management interface identifier from the relay router via the management connection, the management interface identifier being an identifier of an Application Programming Interface (API) in the relay router for providing a management function; and
transmit a management instruction to the relay router via the management connection, the management instruction carrying the management interface identifier and being configured to manage an electronic device connected to the relay router, and wherein both the apparatus for device management and the relay router are configured to provide wireless network access for electronic devices connected thereto, and
wherein acquiring the management interface identifier from the relay router via the management connection comprises:
transmitting a private protocol message to the relay router via the management connection;
receiving a feedback message transmitted from the relay router;
determining whether the relay router is compatible with the primary router according to the feedback message; and
if the relay router is compatible with the primary router, acquiring the management interface identifier from the relay router via the management connection.

12. An apparatus for device management, comprising:
a processor; and
a memory for storing instructions executable by the processor;
wherein the processor is configured to:
establish a management connection with a primary router;
provide the primary router with a management interface identifier via the management connection, the management interface identifier being an identifier of an Application Programming Interface (API) in the apparatus for providing a management function;
receive a management instruction from the primary router via the management connection, the management instruction carrying the management interface identifier; and
manage an electronic device connected to the apparatus according to the management instruction, and
wherein both the apparatus for device management and the primary router are configured to provide wireless network access for electronic devices connected thereto, and
wherein providing the primary router with the management interface identifier via the management connection comprises:
receiving a private protocol message from the primary router via the management connection;
transmitting a feedback message to the primary router, for the primary router to determine whether the relay router is compatible with the primary router according to the feedback message; and
providing the management interface identifier to the primary router via the management connection if the relay router is compatible with the primary router.

13. A network system, comprising
a primary router; and
a relay router connected to the primary router via a wireless or a wired network, both the primary router and the relay router being configured to provide wireless network access for electronic devices connected thereto;
wherein the primary router comprises:
a first processor; and
a first memory for storing first instructions executable by the first processor;
wherein the first processor is configured to:
establish a management connection with the relay router;
acquire a management interface identifier from the relay router via the management connection, the management interface identifier being an identifier of an Application Programming Interface (API) in the relay router for providing a management function; and transmit a management instruction to the relay router via the management connection, the management instruction carrying the management interface identifier and being configured to manage an electronic device connected to the relay router; and wherein the relay router comprises:
a second processor; and
a second memory for storing second instructions executable by the second processor;
wherein the second processor is configured to:
establish the management connection with the primary router;
provide the primary router with the management interface identifier via the management connection;

receive the management instruction from the primary router via the management connection; and
manage the electronic device connected to the relay router according to the management instruction, wherein the first processor acquires the management interface identifier from the relay router via the management connection by:

transmitting a private protocol message to the relay router via the management connection;

receiving a feedback message transmitted from the relay router:

determining whether the relay router is compatible with the primary router according to the feedback message; and if the relay router is compatible with the primary router, acquiring the management interface identifier from the relay router via the management connection.

* * * * *